United States Patent
Hales et al.

(10) Patent No.: US 10,544,779 B2
(45) Date of Patent: Jan. 28, 2020

(54) OVER-RATING CONTROL OF A WIND TURBINE GENERATOR

(71) Applicant: VESTAS WIND SYSTEMS A/S, Aarhus N (DK)

(72) Inventors: Kelvin Hales, Surrey (GB); Chris Spruce, Leatherhead (GB); Søren Lund Bjerregaard, Hvide Sande (DK); Poul Oslo Rasmussen, Lunderskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 184 days.

(21) Appl. No.: 15/529,163

(22) PCT Filed: Nov. 23, 2015

(86) PCT No.: PCT/DK2015/050360
§ 371 (c)(1),
(2) Date: May 24, 2017

(87) PCT Pub. No.: WO2016/082837
PCT Pub. Date: Jun. 2, 2016

(65) Prior Publication Data
US 2017/0356420 A1 Dec. 14, 2017

(30) Foreign Application Priority Data
Nov. 24, 2014 (DK) ................................. 2014 70730

(51) Int. Cl.
*F03D 17/00* (2016.01)
*F03D 7/02* (2006.01)
*F03D 9/25* (2016.01)

(52) U.S. Cl.
CPC ......... *F03D 7/0288* (2013.01); *F03D 7/0224* (2013.01); *F03D 7/0276* (2013.01); *F03D 9/255* (2017.02); *F03D 17/00* (2016.05)

(58) Field of Classification Search
CPC ........ F03D 7/0288; F03D 17/00; F03D 9/255; F05B 2270/01033
See application file for complete search history.

(56) References Cited

U.S. PATENT DOCUMENTS 4,339,666 A * 7/1982 Patrick .................. F03D 7/0224
290/44
2008/0042442 A1 2/2008 Richter et al.
(Continued)

FOREIGN PATENT DOCUMENTS

CN 1871432 A 11/2006
CN 102352815 A 2/2012
(Continued)

OTHER PUBLICATIONS

Danish Search Report for PA 2014 70730, dated Jun. 16, 2015.
(Continued)

*Primary Examiner* — Kevin A Lathers
(74) *Attorney, Agent, or Firm* — Patterson + Sheridan, LLP (57) ABSTRACT

A method is disclosed for controlling a wind turbine generator to provide power above a rated level. The wind turbine includes one or more electrical components that conduct current from the internal generator to supply the external grid. The control method calculates the maximum current that the electrical components can carry at the ambient temperature. The calculated current is combined with a measurement of the voltage and an estimate of reactive power in the system to give a maximum power at which the wind turbine can operate without the maximum allowable current being exceeded for the electrical components. The electrical components may be housed in the main electrical panel of the wind turbine.

21 Claims, 5 Drawing Sheets

(56) References Cited

U.S. PATENT DOCUMENTS

2010/0256829 A1\* 10/2010 Alonso Sadaba ..... F03D 7/0272
                                                              700/287
2010/0283245 A1\* 11/2010 Gjerlov ................ F03D 7/0224
                                                              290/44

FOREIGN PATENT DOCUMENTS

| CN | 102979674 A | 3/2013 |
| CN | 103154509 A | 6/2013 |
| CN | 103161668 A | 6/2013 |
| CN | 103629049 A | 3/2014 |
| EP | 2017936 A1 | 1/2009 |
| EP | 2309122 A1 | 4/2011 |
| EP | 2565442 A1 | 3/2013 |
| GB | 2089901 A | 6/1982 |
| SE | 510315 C2 | 5/1999 |
| WO | 2015014368 A1 | 2/2015 |

OTHER PUBLICATIONS

International Search Report for PCT/DK2015/050360, dated Jan. 28, 2016.
Chinese Office Action for Application No. 201580070849.9 dated Nov. 2, 2018.

\* cited by examiner

OVER-RATING CONTROL OF A WIND TURBINE GENERATOR

This invention relates to over-rating control of wind turbines, and particularly to methods and apparatus which enable one or more wind turbines of a wind power plant to transiently generate power at above the rated output while respecting the limitations on current-carrying capacity of the internal electrical components.

The rated power of a wind turbine is defined in IEC 61400 as the maximum continuous electrical power output that a wind turbine is designed to achieve under normal operating and external conditions. Large commercial wind turbines are generally designed for a lifetime of 20 years in operation at or below their rated power.

Over-rating a wind turbine is desirable because it provides an increase in the annual energy production (AEP) of the turbine. In other words, more energy can be generated over a year than if the turbine were operated solely up to its rated power. However, unrestricted over-rating would lead to increased wear and component fatigue within the turbine, with the result that the lifespan of the turbine would be shortened. Over-rating could also mean that the turbine might need increased maintenance, possibly requiring the turbine to be shut down while an engineer is on site. Shutting a wind turbine down places a greater burden on the remaining turbines in the plant to meet the target power output of the plant at that time, and means that the expected increase in AEP is not realised. Maintenance can also be difficult and expensive as the turbines may be in inaccessible locations. It is therefore beneficial to control the extent to which each wind turbine is over-rated, balancing the desire to meet power output demands with the need to stay within design specifications.

Further considerations may be important in deciding how much to over-rate each wind turbine. For example, a simple control system may only measure the temperatures around particular electrical components in the turbine and use these to place an upper limit on the amount of over-rated power that can be generated. For safety's sake, such systems are designed to be conservative and so may limit the power production unnecessarily leading to a loss of potential generation.

We have therefore appreciated that it would be desirable to provide improved control enabling wind turbines to operate above rated power.

SUMMARY OF THE INVENTION

The invention is defined in the independent claims to which reference should now be made. Advantageous features are set out in the dependent claims.

The present invention relates to a control method for controlling a wind turbine generator, the generator outputting electrical power to a grid, the method comprising: determining the ambient temperature of one or more electrical components in the wind turbine generator, the one or more electrical components carrying a current that is generated by the generator for output to a point of connection with an electrical connection network; determining a maximum safe current for the one or more electrical components based on the ambient temperature of the one or more electrical components; determining a maximum safe power level that the wind turbine generator can supply to the point of connection without exceeding the maximum safe current for the one or more electrical components; and controlling the wind turbine generator so that the power delivered from the generator does not exceed the maximum safe power level.

As a result of the method, changes in the maximum safe current that occur due to temperature variations are taken into account when obtaining a maximum safe power level for the wind turbine generator. If the wind turbine is operating above rated power, the method enables the maximum safe amount of over-rating to be obtained, thereby increasing annual energy production.

The method may comprise obtaining a voltage value at the point of connection between the wind turbine generator and the electrical connection network; and determining said maximum safe power level is based on said voltage value.

The method may comprise determining the maximum safe power level based on the voltage value, and the minimum value of the set of respective maximum safe currents for the one or more electrical components. Therefore in wind turbines comprising more than one electrical component, the component that can carry the lowest maximum current is used in obtaining the maximum safe power level.

The one or more electrical components may be housed in a wind turbine panel coupled to the point of connection with the electrical connection network, or with any other panel in the wind turbine, and the ambient temperature may then be the ambient temperature in the interior of the panel. Thus the method may be used in protecting the electrical components of the wind turbine panel coupled to the point of connection with the electrical connection network, whilst maximising the amount of power that can be safely generated.

The method may comprise determining the reactive power flowing within the wind turbine generator and reducing the determined maximum safe power based on at least one of the reactive power and the active power. The determined maximum safe power level thereby takes account of the additional reactive part of the power that it is necessary to consider when obtaining the maximum safe current limit(s) of the electrical component(s).

The method may comprise determining a maximum safe current for the one or more electrical components by looking up a stored value for the maximum safe current in memory according to the ambient temperature, or by calculating the maximum safe current using an equation. The maximum safe current may therefore be conveniently obtained given the ambient temperature.

The method may comprise controlling the amount of power generation by transmitting a torque reference signal to the generator to maintain the power output below the maximum safe power level.

The method may comprise controlling the amount of power generation by sending a pitch angle control signal to a pitch angle controller responsible for controlling the pitch of the wind turbine blades connected to the generator, the pitching of the wind turbine blades being used to maintain the power output of the generator below the maximum safe power level.

The method may comprise controlling the amount of power generation by sending a rotor speed control signal to the generator to maintain the power output of the generator below the maximum safe power level.

The method may comprise controlling the amount of power generation by sending both a torque reference signal to the generator and a pitch angle control signal to the pitch angle controller.

A wind turbine generator controller configured to perform the method, and a computer readable medium for programming a controller according to the method are also provided.

BRIEF DESCRIPTION OF THE DRAWINGS

Embodiments of the invention will now be described, by way of example only, and with reference to the accompanying drawings, in which.

DETAILED DESCRIPTION

Figure 1:
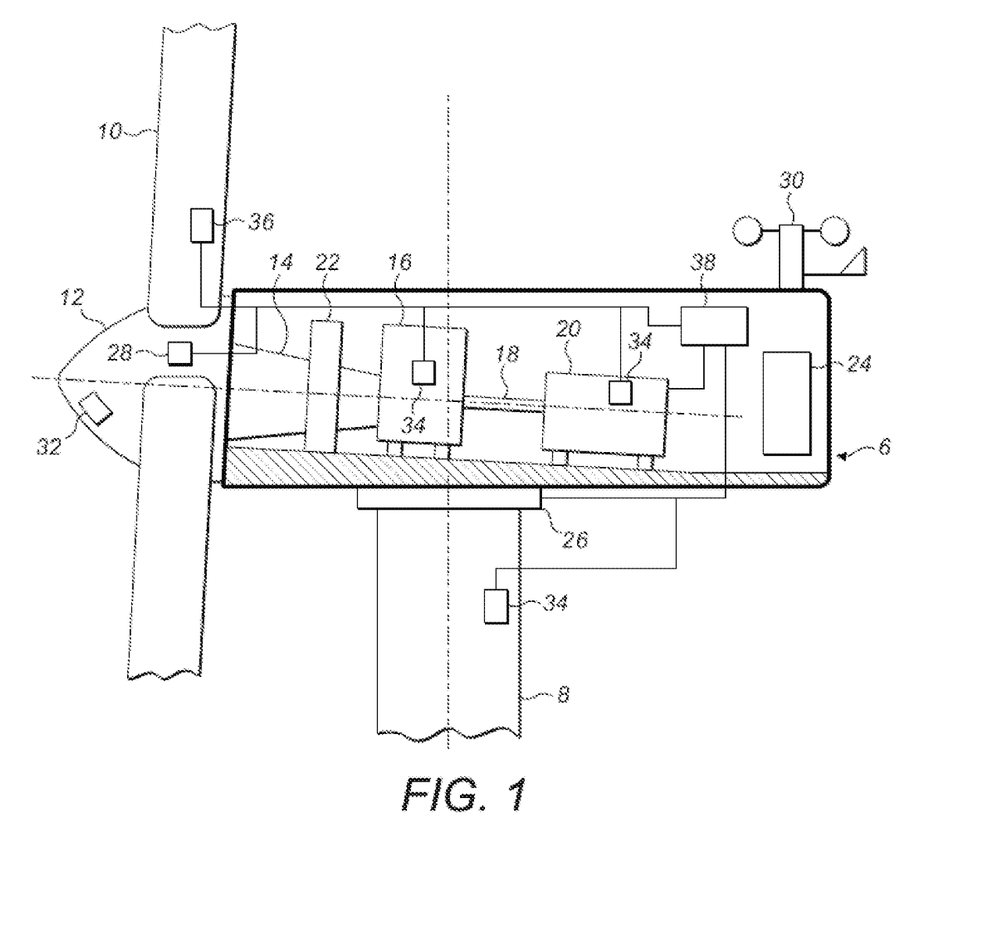
FIG. 1 is a schematic view of a wind turbine nacelle.

FIG. 1 is an illustration of an example wind turbine nacelle 6 mounted on a tower 8. One or more wind turbine blades 10 are connected to the hub 12, which rotates the main drive shaft 14. The drive shaft is coupled to a gearbox 16, which in turn drives a secondary shaft 18. This is coupled to the generator 20. The main drive shaft 14 is supported by the main bearing 22. A power convertor and/or transformer 24 is also housed within the nacelle; but these could also be housed in the base of the tower 8 or located external to the tower. Further components include a yaw drive 26 and pitch actuator 28. Sensors 30, 32, 34, and 36 also feed signals to a controller 38. These sensors may include an anemometer and wind vane 30, ranging wind speed measuring device 32 (for example, LIDAR, RADAR, or SONAR), temperature sensor(s) 34, a blade load sensor 36 or any other sensor that is known on or in a wind turbine. The temperature sensor(s) 34 measure(s) the temperature of the key components, for example the gearbox 16 and/or generator 20, as well as the air temperature both inside and outside the nacelle.

Controller 38 is responsible for controlling the components housed in the wind turbine nacelle 6. Controller 38 may therefore include one or more routines that variously adjust the pitch of the wind turbine blades, control the operation of the generator, and activate safety functions depending on the environmental and operational conditions sensed by the sensors. This description of control functions is not intended to be limiting. In this embodiment, the controller 38 also controls over-rating and therefore outputs one or more over-rating commands to the generator 20 and pitch actuator 28 so that according to the operating conditions the turbine is controlled to operate at above rated power. As will be appreciated by the skilled person, the controller and the various control functions will be suitably implemented in hardware and/or software as appropriate.

Wind turbine generators typically connect to the power-collection network in the wind power plant via a wind turbine electrical main panel. This may for example be located in the nacelle 6 but could also be located at the base of the wind turbine tower 8 or outside the tower. The electric current generated by the wind turbine therefore passes through the main panel before it is appropriately transformed in voltage for collection and then export to the grid. Electrical connections within the main panel must therefore be able to safely carry the high current output from the generator 20, and the amount of current that can be safely carried within the main panel will tend to limit the extent to which a wind turbine may be safely over-rated. As will be described in more detail below, the maximum safe current that can be conducted by individual components in the main panel will tend to be a function of the ambient air temperature in the panel.

Figure 2:
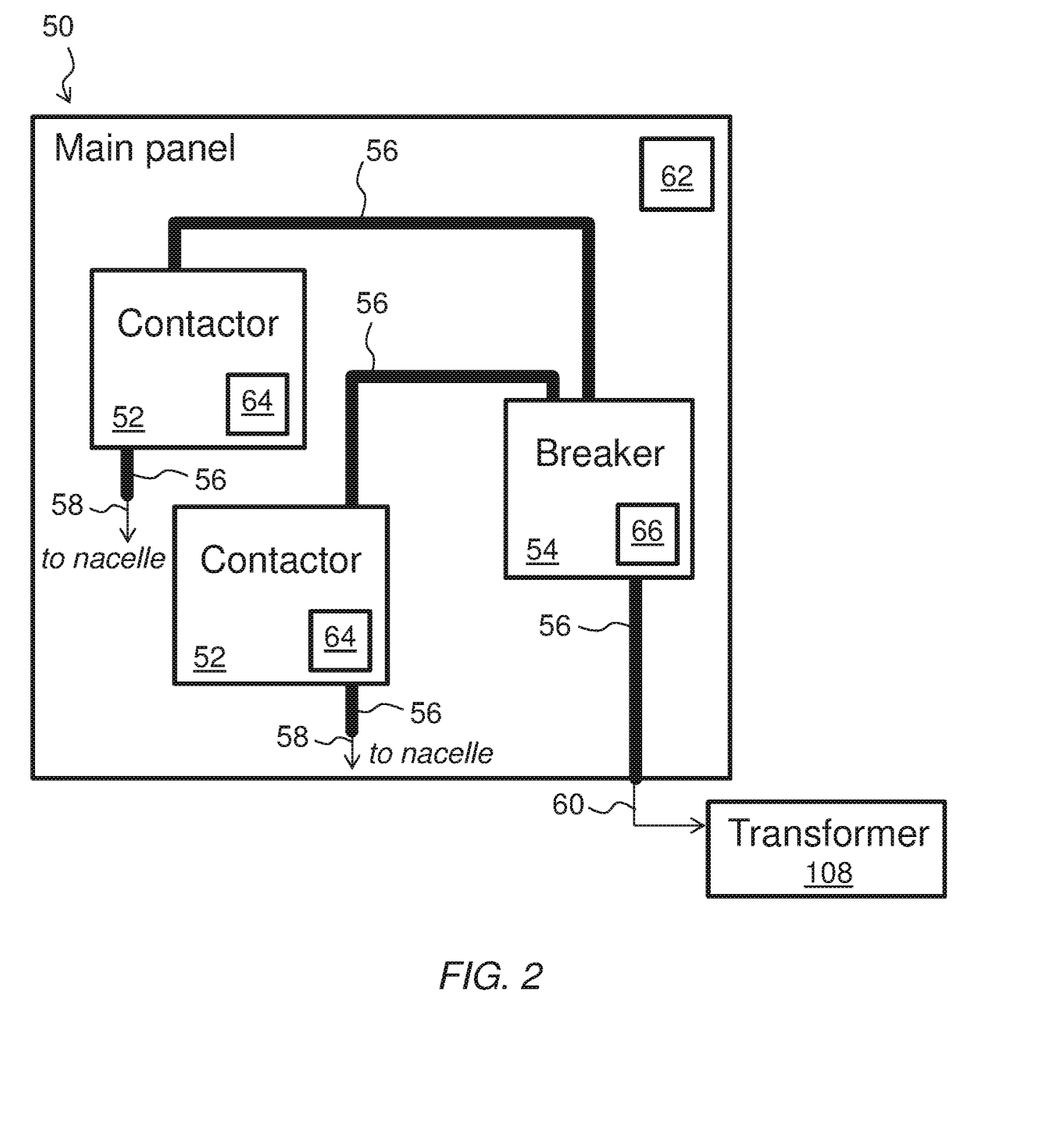
FIG. 2 is a schematic view of an example electrical main panel of a wind turbine.

FIG. 2 illustrates an example wind turbine main panel 50. The main panel includes one or more contactors 52, used to connect and disconnect the generator 20 to/from the transformer 108. The contactors 52 are connected to one or more circuit breakers 54, which can disconnect the turbine when necessary, for example should a pre-set critical current level be exceeded. The connections between the contactors 52 and circuit breakers 54 are made with busbars 56. Cables 58 connect the one or more contactors 52 to the generator 20 housed in the nacelle 6, while cables 60 connect the circuit breaker 54 to the transformer 108. A temperature sensor 62 is also provided to measure the internal air temperature within the main panel 50. Further, temperature sensors 64 and 66 may be positioned on the contactors 52 and breakers 54 respectively, to measure the temperatures of these components directly. The sensors communicate their measurements to the wind turbine controller 38, shown in FIG. 1.

Figure 3:
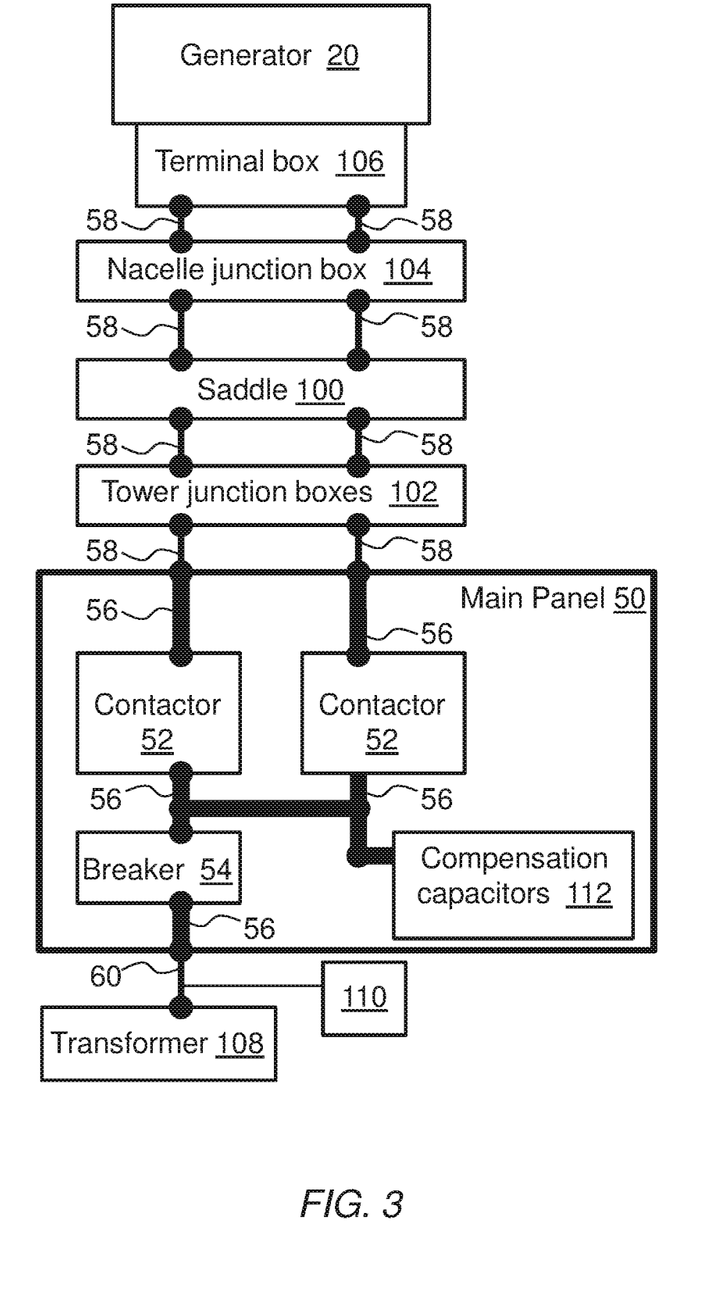
FIG. 3 is a schematic view of an example wind turbine showing the main panel and its connection to other key electrical components.

A typical in-circuit position of the main panel relative to the other electrical power components of the turbine is illustrated in FIG. 3 for a turbine in which the transformer is at the base of the tower. Busbars 56 connect the main panel contactors 52 to cables 58, which connect in turn via the tower junction boxes 102, the saddle 100, the nacelle junction box 104 and the terminal box 106 to the generator 20. Busbars 56 also connect the main panel circuit breakers 54 to cables 60 which deliver the current to transformer 108 before being collected for export to the grid. A voltage sensor 110 is provided to communicate the local grid voltage to the controller 38. Compensation capacitors 112 may also be provided on or close to the main panel, and their capacitive load is used to compensate for the reactive currents set up by the generator.

In this example, the transformer 108 serves as the point of connection between the wind turbine generator and the wind power plant's power collection network, and the voltage sensor 110 detects the voltage just prior to the transformer 108. In the power collection network, power is typically collected from small groups of turbines, each small group belonging to a branch of a network of collection cables. The voltage drops in each branch of the connection network depend upon the current in that branch, the current in all connections downstream, and the grid voltage. Therefore, for the purposes of calculating the over-rating power, the voltage at the point of connection of each individual turbine to the power collection network is measured by voltage sensor 110. This voltage will be referred to as the 'connection voltage' in the following description.

One factor that limits the amount of over-rated power that can be safely generated by a wind turbine is the magnitude of the current through the main panel components. This maximum safe current may depend on, for example, the temperature of the air in the main panel, the temperature of the component in question, and/or the connection voltage. The panel air temperature in particular affects the maximum current, because at higher air temperatures there is less of a temperature difference between the components and their surroundings, and the heat that is generated by resistive heating is less readily transferred to the surroundings. As a result, the component is at a greater risk of overheating unless the current is reduced.

Figure 4:
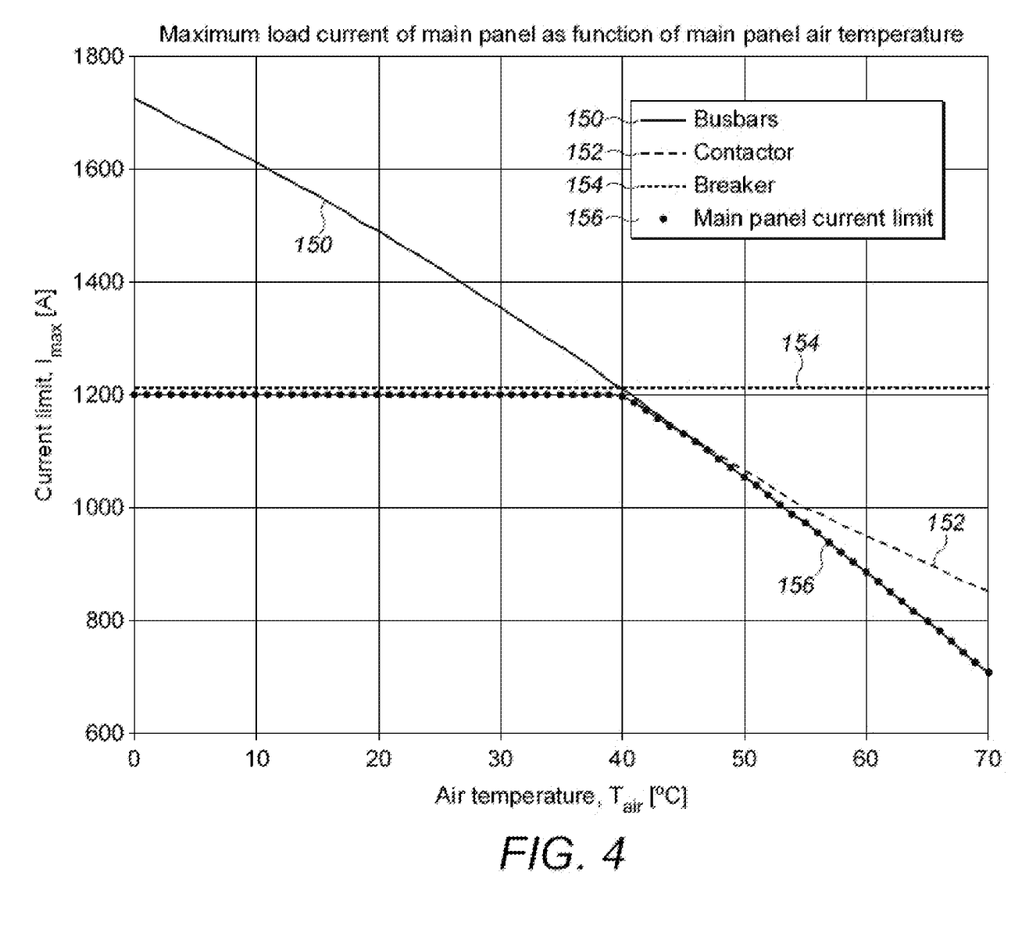
FIG. 4 is a graph illustrating how the maximum current that may be safely carried by various main panel components changes as a function of air temperature, and the resulting overall limit on the current-carrying capacity.

FIG. 4 shows the maximum current, $I_{max}$, that may be safely carried by the main panel components of FIG. 2 as a function of ambient temperature. This data can be obtained from the component manufacturers or by testing the components at different temperatures.

In FIG. 4, line 150 shows the temperature dependence of the maximum allowable busbar current. The maximum safe current that the busbar 56 can conduct decreases continually with rising air temperature. Line 152 shows the temperature dependence of the maximum contactor current, which in this example remains constant at 1200 Amps up to a temperature of 40° C. before decreasing at higher temperatures. However the decrease in the maximum current $I_{max}$ at higher temperatures is less for the contactor 52 than the busbars 56. Line 154 shows the temperature dependence of the maximum breaker current, which in this example is constant at 1212 Amps. The plot line made up of filled circles 156 indicates the lowest of the various maximum currents, and therefore represents the maximum safe current that may be carried as a function of temperature, considering the busbars 56, contactors 52, and breakers 54 together. The data points shown in FIG. 4 are based on the characteristics of actual components in test systems. It will be appreciated however that the data will vary between different systems and are provided here for illustrative purposes only. In one example only a single electrical component will limit the current if, for all temperatures, the maximum safe current through this component is less than the maximum safe current through the other components.

The power output by an electrical generator is generally given by the product of current and voltage at the point of connection to the grid, in this case the main panel for example. The amount of current that must be carried in order to achieve a given amount of electrical power must therefore be higher if the connection voltage falls. Likewise, if the connection voltage rises then the current through the main panel must be correspondingly lower to deliver the same power. The value of the connection voltage, as well as the temperature of the components and their surroundings, is therefore needed to calculate the maximum safe current.

It is known in the art to establish a value for the maximum safe current that may be carried through the main panel components based upon a given air temperature. This places an upper limit on the power that may be generated assuming the worst-case conditions for the connection voltage, so the connection voltage is assumed to be at its lowest permitted operating value for calculating the safe current at a given temperature. This approach is overly conservative because, in practice, the connection voltage is rarely at its lowest allowed value and the control routine therefore assumes that worst case conditions prevail at all times. As a result, the upper limit on the power that the wind turbine can generate at safe main panel current is set too low or lower than it otherwise could be for the great majority of the time, and over-rating is thereby not used effectively. We have appreciated that this control situation can be improved.

Figure 5:
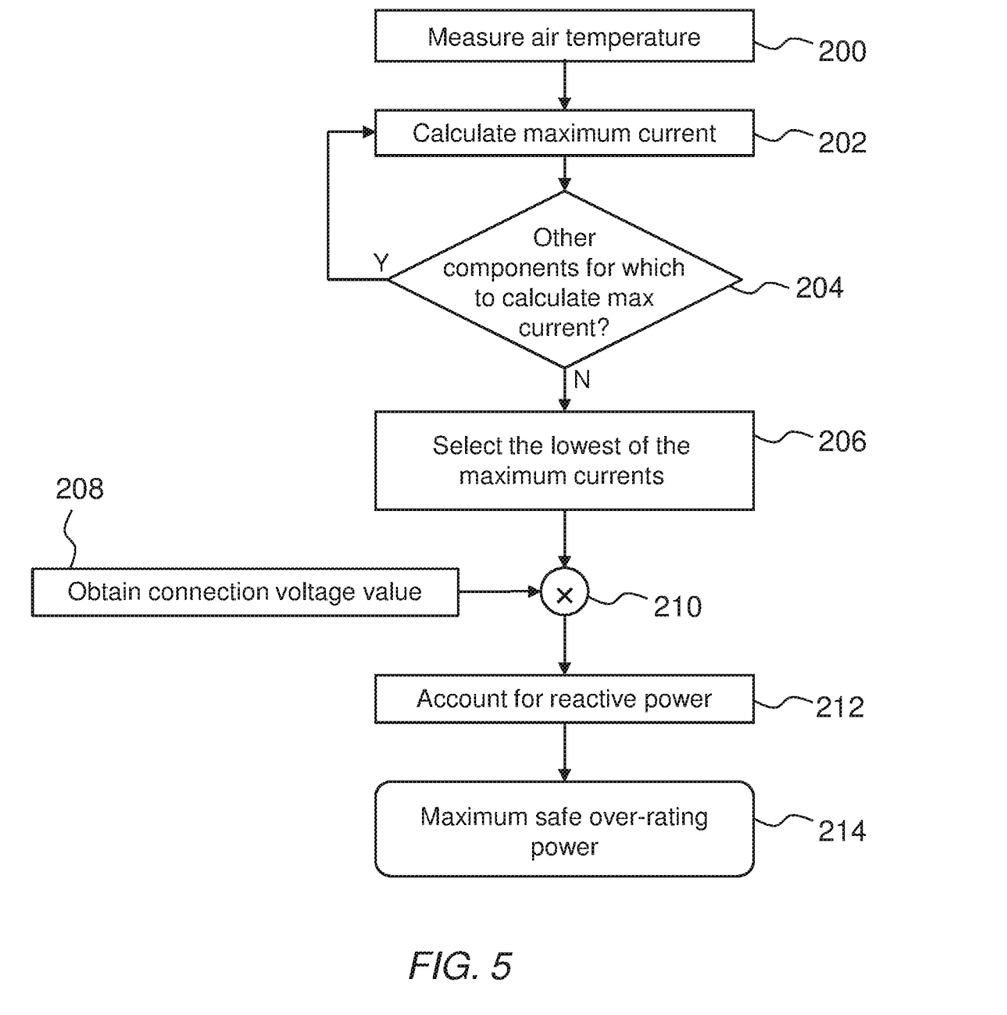
FIG. 5 illustrates a method carried out to determine the maximum safe over-rating power of a wind turbine.

FIG. 5 illustrates a wind turbine control method carried out by the wind turbine controller, according to an embodiment of the invention. The control method calculates the maximum safe over-rating power based on both the prevailing connection voltage and the maximum safe main panel current determined by the prevailing main panel air temperature or the prevailing local component temperatures.

First, in step 200, sensor 62 measures the air temperature in the main panel 50. In step 202, the controller determines the maximum current for a first component in the main panel and stores this in memory. Determining the maximum safe current can be achieved in a number of ways, such as by looking up maximum current data for a given temperature in a look-up table, or by using a mathematical formula to calculate the maximum allowed current for a given temperature. In practice, such data or formulae may be obtained from the manufacturer's specification sheets, design calculations, and/or offline measurements of the components' performance. For example, FIG. 4, as discussed above, illustrates the maximum currents for the contactors 52, circuit breakers 54 and busbars 56. In one embodiment, the data points of FIG. 4 may therefore be stored in memory and accessed by the controller when performing the calculation.

Step 202 is repeated for a second and for subsequent components in the main panel 50 until a maximum safe current has been calculated for each. This is depicted by the control loop of decision box 204. In step 206, the controller then selects the lowest of the maximum safe currents calculated for each component and stored in memory, and sets this as the maximum safe current for the main panel as a whole.

In the above calculation, the main panel air temperature as measured by sensor 62 is used as the main input for determining the safe current for each component. As indicated in FIG. 2 however, additional temperature sensors 64 and 66 may also be placed close to or in contact with respective components to measure the air temperature within the panel at particular locations. This can give a more accurate indication of the actual ambient air temperature for each component. In an alternative embodiment therefore the measurement of main panel air temperature made by sensor 62 is either replaced by or supplemented by respective measurements of local air temperature in the main panel by sensors 64 and 66.

In step 208, the controller 38 obtains a measurement of the connection voltage. The connection voltage is a parameter that is regularly measured for other purposes by wind turbine control systems, and the controller 38 may obtain the measurement from existing sensors either in the main panel, or at the point of connection between a wind turbine and the collection networks. In this embodiment, the controller queries voltage sensor 110 shown in FIG. 3. In alternative embodiments, the controller 38 may have stored the value of the connection voltage in memory already for other purposes and simply look up the value in step 208.

In step 210, the value for connection voltage is multiplied by the maximum safe current obtained in step 206 to obtain a maximum limit on power generation for safe over-rating control.

It will be appreciated that the current through the components in the main panel 50 will include both active and reactive power components. The maximum safe current calculated for a given air temperature will therefore need to be adjusted to take into account the presence of reactive power in the system. It will be appreciated that the controller operates the wind turbine generator to provide a set amount of active power P to the collection network. However, the power factor within the wind turbine will typically not be unity, meaning that there will also be a reactive power component Q associated with currents moving back and forth between the generator 20 and the transformer 108 via the main panel 50 which energise the capacitive circuit elements (for example, compensation capacitors 112) and inductive circuit elements (for example, generator 20). If the power factor for current within the wind turbine is 0.9, for example, then only 90% of the current in the system will result in active power, and the calculated limit on power generation will therefore need to be set at 90% of the value of the apparent power, where apparent power is the vector sum of the active and reactive power.

The current in the component will reflect the apparent power and will therefore include both the real and reactive power components. In step 212 therefore, the controller 38 makes a downward adjustment to the power limit calculated in step 210 based on the power factor. For example, if the power factor is 0.9, then step 212 will consist of multiplying the output of block 210 by 0.9 to give the maximum safe over-rating power. The power factor may either be measured on-line and an instantaneous value used in the compensation, or a worst case value can be calculated off-line and used in the compensation. As the characteristics of the generator are known, determining an estimated reactive power it draws is straightforward.

This calculated power limit, P, adjusted to account for estimated reactive current flow, is therefore output in step 214. The maximum limit on power is then used by the controller 38 to control the turbine so that the power value does not exceed the maximum safe power calculated in step 210. This in turn ensures that the current flowing through the main panel does not exceed the safe current for that temperature.

As noted above, in alternative embodiments the temperature of the individual components 52 to 60 may also be detected using optional sensors 64 and 66 and used in the control method. Measurements of the individual component temperatures allow more precision in the calculation of maximum permitted current reflecting the fact that the components themselves will heat up at different rates, and the temperature across the main panel will not necessarily be uniform. The measured temperatures can also act as a safety mechanism to ensure that despite the limitation of maximum permitted current the temperature of the individual components does not exceed safe levels.

The steps of the method depicted in FIG. 5 may be carried out online, in real time, by the turbine control system to provide a dynamic limit on the maximum amount of over-rated power that can be safely generated by the turbine at that particular moment.

In the example described above, the safe power limit is used directly by the controller 38 to limit the power reference sent to the turbine's power-control. In alternative embodiments, the control method illustrated in FIG. 5 could include further steps in which the maximum over-rated power P is converted by the power-control system into a corresponding maximum limit on generator load torque G and/or rotor angular velocity ω, via the relation P=G ω. This would apply for turbines where over-rated operation is constrained using one or both of these variables instead of being constrained directly by the power.

Although the over-rating control function of FIG. 5 has been described as part of the controller 38, the control may be implemented as a separate dedicated controller positioned closer to the main panel and providing an output to the separate controller responsible for the operation of the generator or to the power plant controller. Further, although the control method has been described as determining the air temperature within the main panel it will be appreciated that the main panel could be filled with other gases, such as inert gases. In those cases, the term air temperature is intended to include the temperature of whatever gases are present inside the main panel.

The embodiments described above are for example purposes only, and it will be appreciated that features of different embodiments may be combined with one another.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for controlling a generator of a wind turbine, the method comprising:
   determining an ambient temperature of one or more electrical components in the wind turbine, the one or more electrical components carrying a current that is generated by the generator for output to a point of connection with an electrical connection network;
   determining a maximum safe current for the one or more electrical components based on the ambient temperature of the one or more electrical components;
   obtaining a voltage value at the point of connection;
   determining, based at least in part on a multiplicative product of the maximum safe current and the voltage value, a maximum safe power level that the generator can supply to the point of connection without exceeding the maximum safe current for the one or more electrical components; and
   controlling the generator so that the power delivered from the generator does not exceed the maximum safe power level.

2. The method of claim 1,
   wherein the one or more electrical components comprises a plurality of electrical components, and
   wherein determining the maximum safe current for the one or more electrical components comprises:
      determining a set of respective maximum safe currents corresponding to each of the plurality of electrical components; and
      selecting a minimum value of the set of respective maximum safe currents.

3. The method of claim 1,
   wherein the one or more electrical components are housed in a wind turbine panel coupled to the point of connection with the electrical collection network, and
   wherein the ambient temperature is an ambient temperature in an interior of the panel.

4. The method of claim 1, further comprising:
   determining a reactive power flowing within the generator; and
   reducing the determined maximum safe power level based on the reactive power.

5. The method of claim 1, wherein determining a maximum safe current for the one or more electrical components comprises one of:
   using the ambient temperature, looking up in a memory a stored value for the maximum safe current, and
   calculating the maximum safe current using an equation.

6. The method of claim 1, wherein controlling the generator comprises:
   transmitting a torque reference signal to the generator to maintain the power delivered from the generator less than the maximum safe power level.

7. The method of claim 1, wherein controlling the generator comprises:
   transmitting a pitch angle control signal to a pitch angle controller responsible for controlling a pitch of one or more blades connected to the generator,
   wherein pitching the one or more blades maintains the power delivered from the generator less than the maximum safe power level.

8. The method of claim 1, wherein controller the generator comprises:
transmitting a rotor speed control signal to the generator to maintain the power delivered from the generator less than the maximum safe power level.

9. The method of claim 1, wherein the determined maximum safe power level is greater than a nominal power output of the generator.

10. A controller operable to control a generator of a wind turbine, the controller performing an operation comprising:
determining an ambient temperature of one or more electrical components in the wind turbine, the one or more electrical components carrying a current that is generated by the generator for output to a point of connection with an electrical connection network;
determining a maximum safe current for the one or more electrical components based on the ambient temperature of the one or more electrical components;
obtaining a voltage value at the point of connection;
determining, based at least in part on a multiplicative product of the maximum safe current and the voltage value, a maximum safe power level that the generator can supply to the point of connection without exceeding the maximum safe current for the one or more electrical components; and
controlling the generator so that the power delivered from the generator does not exceed the maximum safe power level.

11. The method of claim 1, wherein the one or more electrical components comprise a first electrical component and a second electrical component, wherein determining the ambient temperature of the one or more electrical components comprises:
determining a first ambient temperature of the first electrical component and the second electrical component using a first sensor that is (i) spaced apart from the first electrical component and (ii) configured to measure an air temperature within an enclosure that houses the first electrical component and the second electrical component.

12. The method of claim 11, wherein the one or more electrical components further comprise a third electrical component within the enclosure, wherein determining the ambient temperature of the one or more electrical components further comprises:
determining a second ambient temperature of the third electrical component using a second sensor that is placed close to, or that is in contact with, the third electrical component.

13. The controller of claim 10,
wherein the one or more electrical components comprises a plurality of electrical components, and
wherein determining the maximum safe current for the one or more electrical components comprises:
determining a set of respective maximum safe currents corresponding to each of the plurality of electrical components; and
selecting a minimum value of the set of respective maximum safe currents.

14. The controller of claim 10,
wherein the one or more electrical components are housed in a wind turbine panel coupled to the point of connection with the electrical collection network, and
wherein the ambient temperature is an ambient temperature in an interior of the panel.

15. The controller of claim 10, wherein the operation further comprises:
determining a reactive power flowing within the generator; and
reducing the determined maximum safe power level based on the reactive power.

16. The controller of claim 10, wherein determining a maximum safe current for the one or more electrical components comprises one of:
using the ambient temperature, looking up in a memory a stored value for the maximum safe current, and
calculating the maximum safe current using an equation.

17. The controller of claim 10, wherein controlling the generator comprises:
transmitting a torque reference signal to the generator to maintain the power delivered from the generator less than the maximum safe power level.

18. The controller of claim 10, wherein controlling the generator comprises:
transmitting a pitch angle control signal to a pitch angle controller responsible for controlling a pitch of one or more blades connected to the generator,
wherein pitching the one or more blades maintains the power delivered from the generator less than the maximum safe power level.

19. The controller of claim 10, wherein controlling the generator comprises:
transmitting a rotor speed control signal to the generator to maintain the power delivered from the generator less than the maximum safe power level.

20. The controller of claim 10, wherein the determined maximum safe power level is greater than a nominal power output of the generator.

21. A computer-readable medium containing computer code, which when executed by a controller of a wind turbine causes the controller to perform an operation comprising:
determining an ambient temperature of one or more electrical components in the wind turbine, the one or more electrical components carrying a current that is generated by a generator of the wind turbine for output to a point of connection with an electrical connection network;
determining a maximum safe current for the one or more electrical components based on the ambient temperature of the one or more electrical components;
obtaining a voltage value at the point of connection;
determining, based at least in part on a multiplicative product of the maximum safe current and the voltage value, a maximum safe power level that the generator can supply to the point of connection without exceeding the maximum safe current for the one or more electrical components; and
controlling the generator so that the power delivered from the generator does not exceed the maximum safe power level.

* * * * *